United States Patent
Gomez et al.

(10) Patent No.: US 12,548,098 B2
(45) Date of Patent: Feb. 10, 2026

(54) CONTINUOUS MONITORING SYSTEM FOR DETECTING, LOCATING, AND QUANTIFYING FUGITIVE EMISSIONS

(71) Applicant: Schlumberger Technology Corporation, Sugar Land, TX (US)

(72) Inventors: Francisco Jose Gomez, Abingdon (GB); Christopher Gerard Lunny, Menlo Park, CA (US); Carsten Falck Russenes, Sandsli (NO); Minghao Pan, Abingdon (GB); Karl Staffan Tekin Eriksson, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 246 days.

(21) Appl. No.: 18/342,937

(22) Filed: Jun. 28, 2023

(65) Prior Publication Data
US 2024/0005431 A1  Jan. 4, 2024

Related U.S. Application Data

(60) Provisional application No. 63/367,361, filed on Jun. 30, 2022.

(51) Int. Cl.
| | |
|---|---|
| *G06Q 50/26* | (2024.01) |
| *E21B 47/12* | (2012.01) |
| *E21B 47/18* | (2012.01) |

(52) U.S. Cl.
CPC ........... *G06Q 50/26* (2013.01); *E21B 47/138* (2020.05); *E21B 47/18* (2013.01)

(58) Field of Classification Search
CPC .............. G06Q 50/26; G01N 33/0036; G01N 33/0062; G01N 33/0063; G01N 33/0065
See application file for complete search history.

(56) References Cited

U.S. PATENT DOCUMENTS

| | | | |
|---|---|---|---|
| 10,962,437 B1 * | 3/2021 | Nottrott | G01N 21/3504 |
| 12,163,939 B2 * | 12/2024 | Brandt | G01N 33/225 |

(Continued)

FOREIGN PATENT DOCUMENTS

| | | | | |
|---|---|---|---|---|
| KR | 1020120058444 A | 6/2012 | | |
| WO | WO-2019215438 A1 * | 11/2019 | | F17D 5/02 |

OTHER PUBLICATIONS

Brereton, Carol A. et al.; "Identifying sources of fugitive emissions in industrial facilities using trajectory statistical methods"; published 2012; Atmospheric Environment; vol. 51; as published pp. 46-55, document pp. 1-10 (Year: 2012).*

(Continued)

*Primary Examiner* — Resha Desai
*Assistant Examiner* — Michael C Moroney
(74) *Attorney, Agent, or Firm* — Jeffrey D. Frantz

(57) ABSTRACT

A method includes determining where to place one or more devices at a site. Each device includes a first sensor configured to measure a concentration of a greenhouse gas (GHG). The method also includes measuring the concentration of the GHG with the first sensors. The method also includes quantifying a rate that the GHG is emitted based at least partially upon the measured concentration of the GHG. The method also includes determining a location of a GHG-emitting source at the site that is emitting the GHG that is measured by the first sensors. The location is determined based at least partially upon the measured concentration, the quantified rate, or both. The method also includes identifying the GHG-emitting source at the determined location by comparing the determined location with a list of a plurality of GHG-emitting sources at the site and locations thereof.

19 Claims, 7 Drawing Sheets

(56) References Cited

U.S. PATENT DOCUMENTS

| | | |
|---|---|---|
| 2010/0042332 A1 | 2/2010 | Khajehnajafi |
| 2011/0215936 A1* | 9/2011 | Ansari ................. G01M 3/002 340/584 |
| 2014/0195158 A1* | 7/2014 | Sloop ................. G01N 33/0004 73/1.06 |
| 2014/0236521 A1* | 8/2014 | Wong ..................... G01P 21/02 702/100 |
| 2015/0211885 A1 | 7/2015 | Rutherford et al. |
| 2016/0161456 A1* | 6/2016 | Risk .......................... G01P 5/06 702/24 |
| 2017/0216893 A1* | 8/2017 | Campanella ............ B09B 1/006 |
| 2020/0217742 A1 | 7/2020 | Steele et al. |
| 2021/0010929 A1 | 1/2021 | Langland et al. |
| 2021/0017926 A1* | 1/2021 | Alkadi ............... G01N 21/3504 |
| 2021/0247369 A1* | 8/2021 | Nottrott ............. G01N 33/0047 |
| 2022/0065834 A1 | 3/2022 | Gadot et al. |
| 2022/0091026 A1* | 3/2022 | Scott ..................... G01P 13/045 |
| 2022/0196512 A1* | 6/2022 | Allmaras ............... G06Q 10/06 |
| 2022/0205967 A1* | 6/2022 | Thoma ..................... H04Q 9/00 |
| 2023/0003705 A1* | 1/2023 | Peng ....................... G06Q 50/02 |
| 2023/0007082 A1* | 1/2023 | Kelly ....................... H04L 67/12 |
| 2023/0128460 A1* | 4/2023 | Safar ....................... F23G 7/085 110/185 |
| 2023/0176023 A1 | 6/2023 | Wang et al. |
| 2023/0194376 A1* | 6/2023 | O'Driscoll ............ G06T 7/0004 73/40.5 R |
| 2023/0213413 A1* | 7/2023 | Mohr, Jr. ........... G01N 33/0073 73/31.01 |
| 2023/0304982 A1* | 9/2023 | Eichenlaub ........ G01N 33/0062 |

OTHER PUBLICATIONS

Search Report and Written Opinion of International Patent Application No. PCT/US2023/026401 dated Oct. 12, 2023, 11 pages.

Zhang, Y. et al., Quantifying methane emissions from the largest oil-producing basin in the United States from space. Science Advances, 2020, 6(17), 9 pages.

* cited by examiner

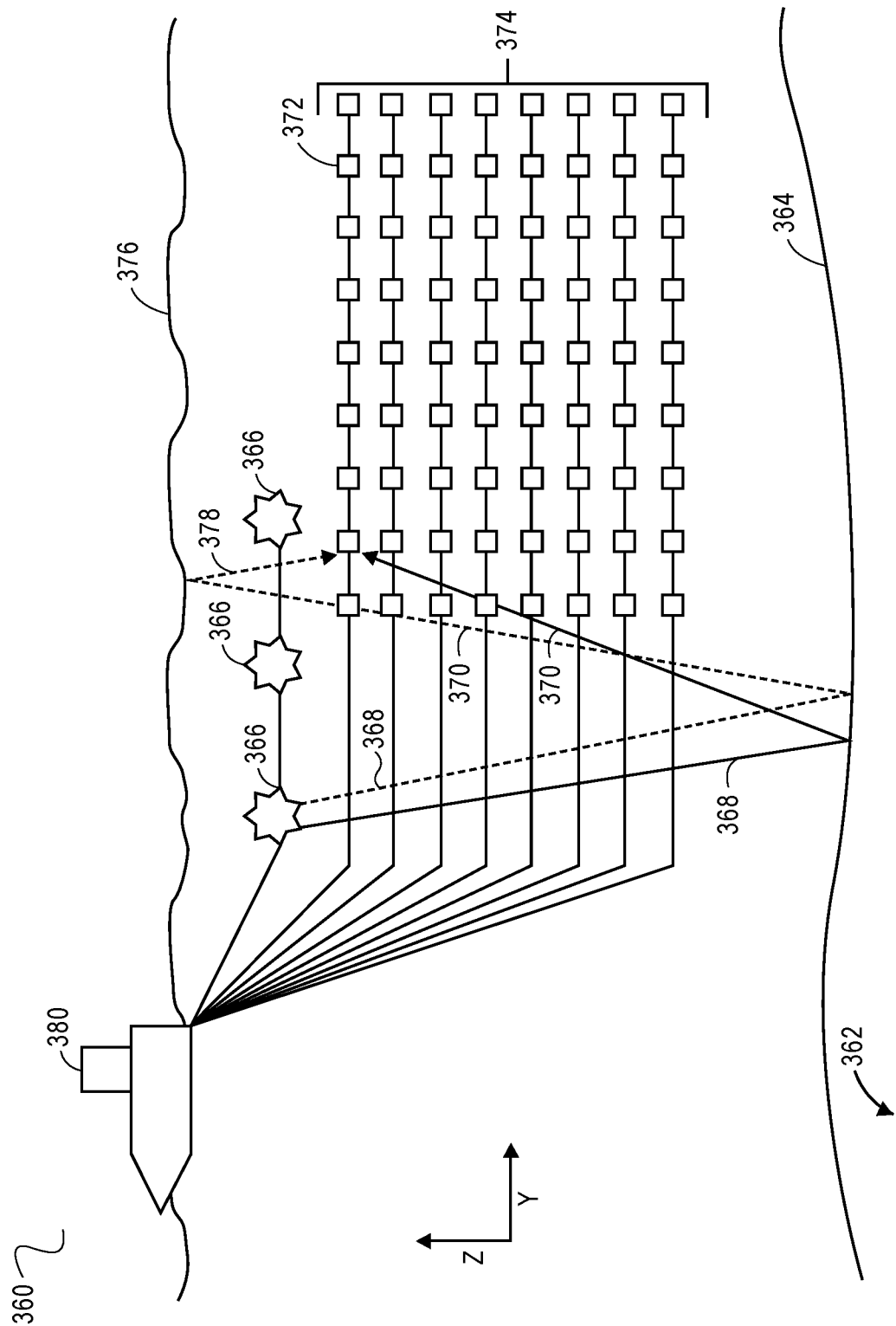

CONTINUOUS MONITORING SYSTEM FOR DETECTING, LOCATING, AND QUANTIFYING FUGITIVE EMISSIONS

RELATED APPLICATIONS

This application claims priority to and the benefit of a US Provisional application having Ser. No. 63/367,361, filed 30 Jun. 2022, which is incorporated by reference herein in its entirety.

BACKGROUND

Methane is an anthropogenic greenhouse gas (GHG) in the atmosphere. Methane is 80 times more potent than carbon dioxide over a 20-year period and 30 times more potent over the course of a century. Oil and gas fugitive emissions are responsible for around 4% of total GHG emissions. Fugitive emissions are unintentional emissions (e.g., a leak) that are traditionally detected when a maintenance operation is performed on a facility or when regulators ask for the implementation of periodic leak detection and repair (LDAR) programs. The LDAR programs have limited efficiency in areas where facilities are sparse, due to the speed at which an operator can survey a facility and low frequency of inspections, usually annually or biannually. This means that a leak can go undetected for weeks, months, or longer. More stringent environmental targets imposed by stakeholders and financial institutions, more stringent rules for licenses to operate, and continuously evolving regulations are driving oil and gas operators to search for effective solutions that can help them to detect and abate fugitive emissions with fast turnarounds.

SUMMARY

A method is disclosed. The method includes determining where to place one or more devices at a site. Each device includes a first sensor configured to measure a concentration of a greenhouse gas (GHG). The method also includes measuring the concentration of the GHG with the first sensors. The method also includes quantifying a rate that the GHG is emitted based at least partially upon the measured concentration of the GHG. The method also includes determining a location of a GHG-emitting source at the site that is emitting the GHG that is measured by the first sensors. The location is determined based at least partially upon the measured concentration, the quantified rate, or both. The method also includes identifying the GHG-emitting source at the determined location by comparing the determined location with a list of a plurality of GHG-emitting sources at the site and locations thereof. The method also includes displaying the site and the identified GHG-emitting source at the determined location.

A computing system is also disclosed. The computing system includes one or more processors and a memory system. The memory system includes one or more non-transitory computer-readable media storing instructions that, when executed by at least one of the one or more processors, cause the computing system to perform operations. The operations include determining where to place one or more devices at a site. Each device includes a first sensor configured to measure a concentration of a greenhouse gas (GHG). The operations also include measuring the concentration of the GHG with the first sensors. The operations also include quantifying a rate that the GHG is emitted based at least partially upon the measured concentration of the GHG. The operations also include determining a location of a GHG-emitting source at the site that is emitting the GHG that is measured by the first sensors. The location is determined based at least partially upon the measured concentration, the quantified rate, or both. The operations also include identifying the GHG-emitting source at the determined location by comparing the determined location with a list of a plurality of GHG-emitting sources at the site and locations thereof. The operations also include displaying the site and the identified GHG-emitting source at the determined location.

A non-transitory computer-readable medium is also disclosed. The medium stores instructions that, when executed by at least one processor of a computing system, cause the computing system to perform operations. The operations include determining where to place one or more devices at a site. Each device includes a first sensor configured to measure a concentration of a greenhouse gas (GHG). The operations also include measuring the concentration of the GHG with the first sensors. The operations also include quantifying a rate that the GHG is emitted based at least partially upon the measured concentration of the GHG. The operations also include determining a location of a GHG-emitting source at the site that is emitting the GHG that is measured by the first sensors. The location is determined based at least partially upon the measured concentration, the quantified rate, or both. The operations also include identifying the GHG-emitting source at the determined location by comparing the determined location with a list of a plurality of GHG-emitting sources at the site and locations thereof. The operations also include displaying the site and the identified GHG-emitting source at the determined location.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DETAILED DESCRIPTION

Figure 1A:
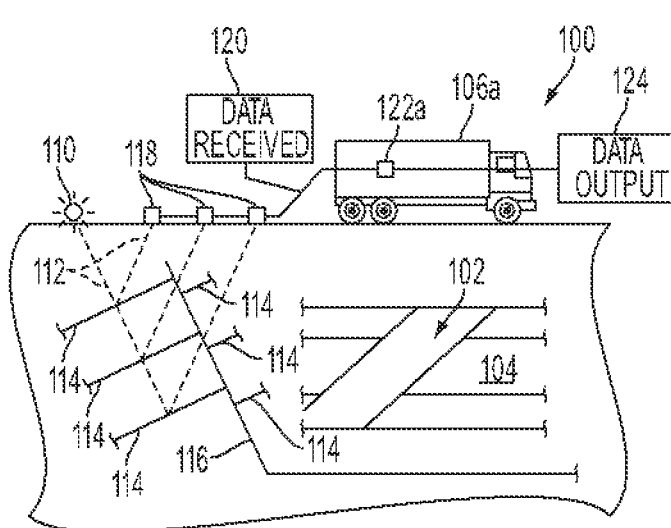

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. Although embodiments of the present method are at least partially described herein with reference to an oilfield, it will be appreciated that this is merely an illustrative example. Embodiments of the present method may be employed in any application in which detecting fugitive emissions may be useful.

FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

Figure 1B:
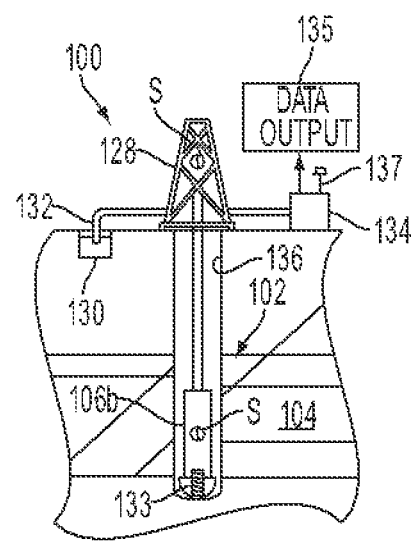

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. For example, sensors (S) may include one or more sensors to measure: a concentration of a greenhouse gas, a solar radiation, a humidity, GPS coordinates, and/or a temperature. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received and/or analyzed. Surface unit 134 may receive commands via transceiver 137 or may itself execute commands to the controller. A processor may be provided to analyze the data (locally or remotely), make the decisions and/or actuate the controller. In an embodiment, actions performed by the controller may include generating and/or transmitting a signal to fugitive emission source(s), an authorized user, or a combination thereof. In another embodiment, actions performed by the controller may include reducing the speed of the source(s) that is/are generating the fugitive emissions, turning off the source(s) that is/are generating the fugitive emissions, repairing the source(s) that is/are generating the fugitive emissions to reduce the emissions, replacing the source(s) that is/are generating the fugitive emissions, or a combination thereof. In this manner, oilfield 100 may be selectively adjusted based on the data collected. This technique may be used to optimize (or improve) portions of the field operation, such as controlling drilling, weight on bit, pump rates, fugitive emissions, or other parameters. These adjustments may be made automatically based on computer protocol, and/or manually by an operator. In some cases, well plans may be adjusted to select optimum (or improved) operating conditions, or to avoid problems.

Figure 1C:
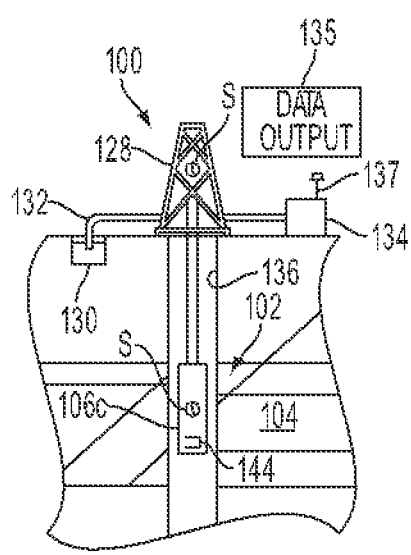

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, and/or one or more sensors to measure: a concentration of a greenhouse gas, a solar radiation, a humidity, GPS coordinates, and/or a temperature, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

Figure 1D:
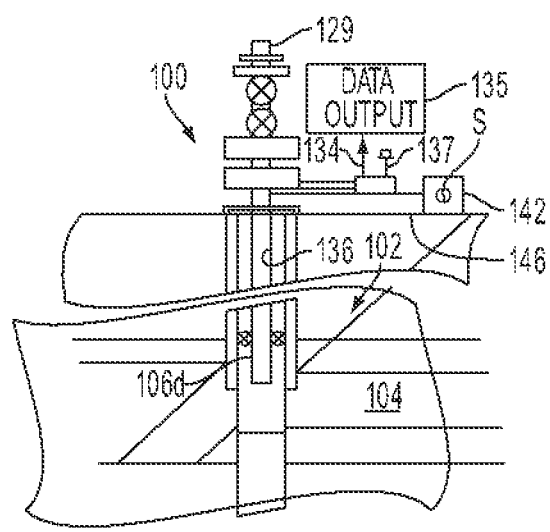

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, and/or one or more sensors to measure: a concentration of a greenhouse gas, a solar radiation, a humidity, GPS coordinates, and/or a temperature, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions in the oilfield, along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
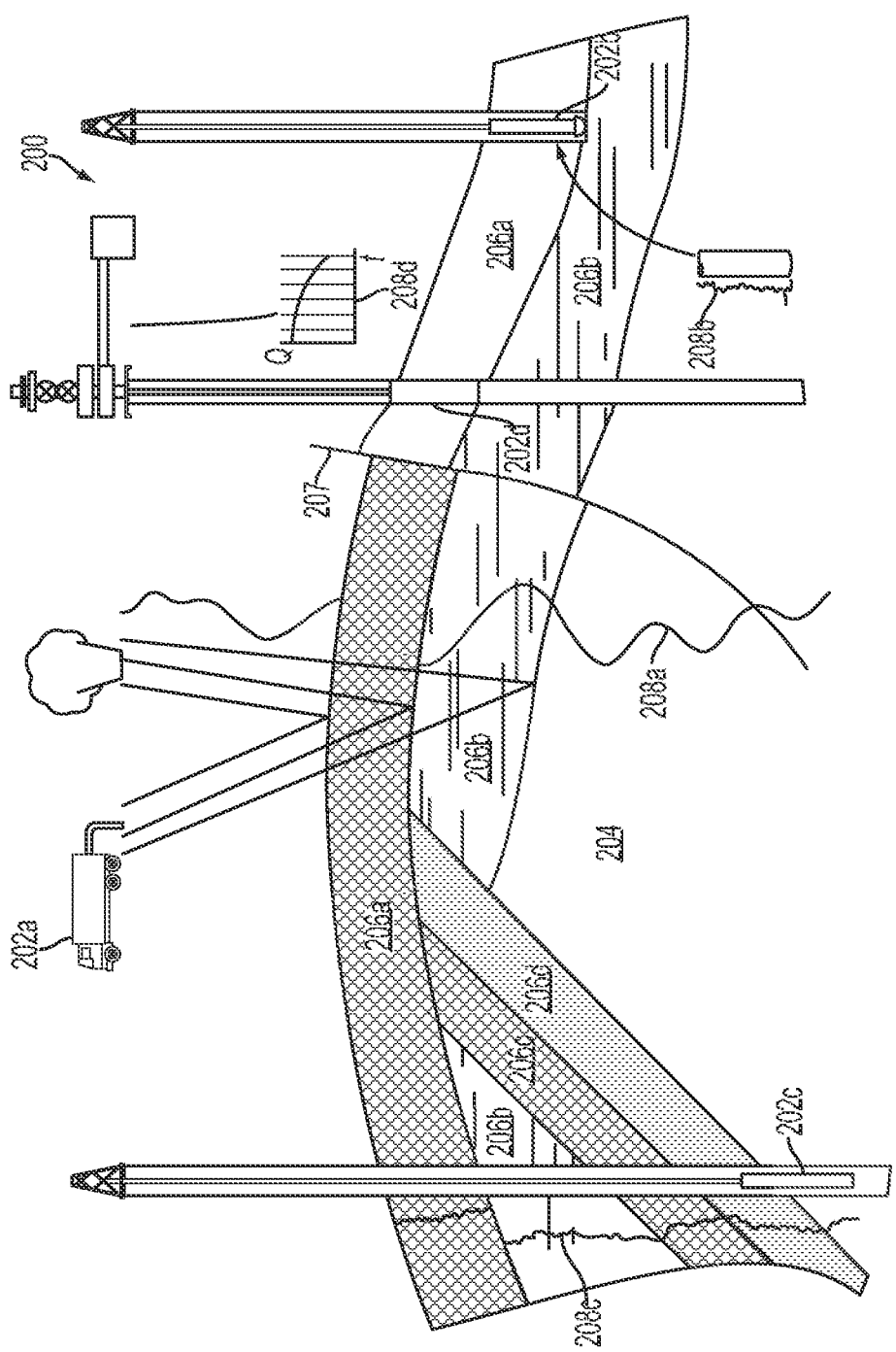

FIG. 2 illustrates a schematic view, partially in cross section of oilfield 200 having data acquisition tools 202a, 202b, 202c and 202d positioned at various locations along oilfield 200 for collecting a concentration of a greenhouse gas, a solar radiation, a humidity, GPS coordinates, and/or a temperature, and/or other data of subterranean formation 204 in accordance with implementations of various technologies and techniques described herein. Data acquisition tools 202a, 202b, 202c, 202d may be the same as data acquisition tools 106a, 106b, 106c, 106d of FIGS. 1A-1D, respectively, or others not depicted. As shown, data acquisition tools 202a, 202b, 202c, 202d generate data plots or measurements 208a, 208b, 208c, 208d, respectively. These data plots are depicted along oilfield 200 to demonstrate the data generated by the various operations.

Data plots 208a, 208b, 208c, 208d are examples of static data plots that may be generated by data acquisition tools 202a, 202b, 202c, 202d, respectively; however, it should be understood that data plots 208a, 208b, 208c, 208d may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as concentration of a greenhouse gas data, solar radiation data, humidity data, GPS coordinates, temperature data, historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a, 206b, 206c, 206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
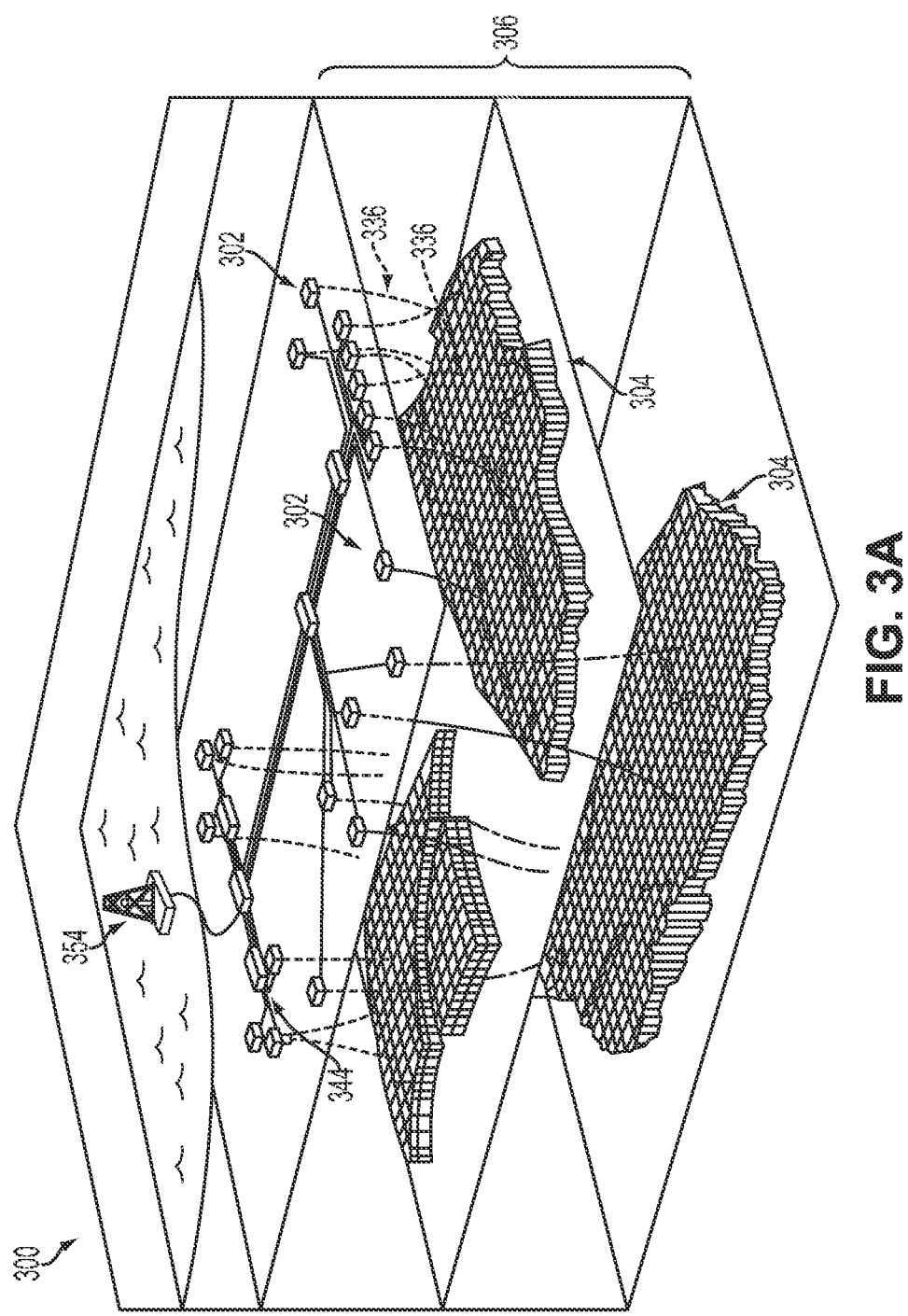

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Continuous Monitoring System and Method for Detecting, Locating, and Quantifying Fugitive Emissions A system including one or more sensors may be configured to continuously monitor a remote site (e.g., a wellsite) or group of sites with the ability to transmit measurements to a solution hosted in a public or private cloud. Accordingly, the present disclosure may include a cloud-based system and method that can continuously monitor remote facilities by: (1) detecting excessive atmospheric GHG concentrations from fugitive GHG emissions, (2) quantifying the amount and/or rate of GHG emissions, (3) locating the point source of the GHG emissions, (4) identifying probable (e.g., most likely) source from an inventory list, and/or (5) triggering an alert when issues are found (e.g., the GHG concentrations and/or GHG rate exceeds a predetermined threshold) so corrective actions can be initiated in a timely fashion. As used herein, "excessive" refers to a level above a predetermined (e.g., background) concentration given a threshold of detection. As used herein, "probable source objects" refers to likely sources of the methane emissions (e.g., generators).

Figure 4:
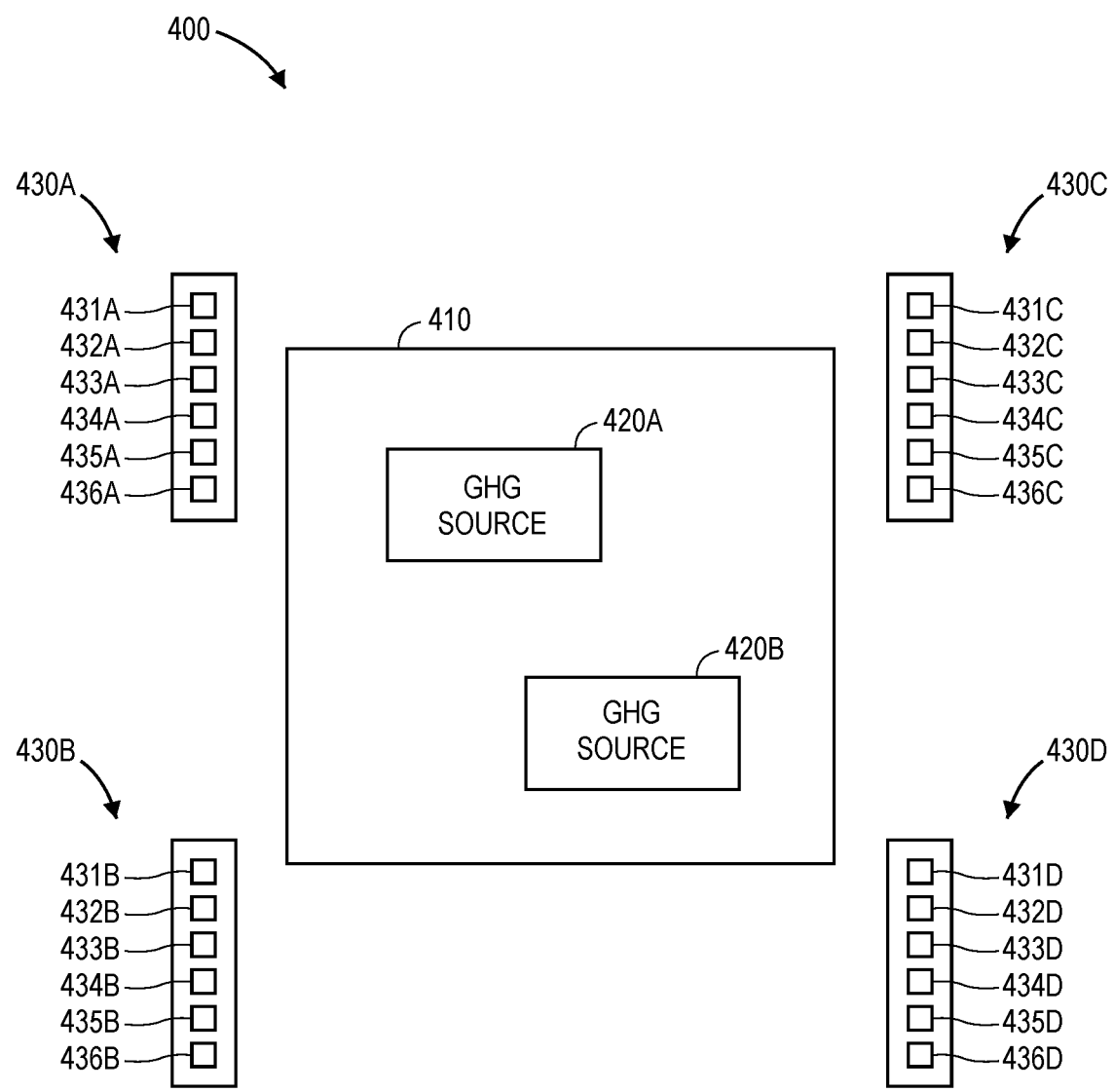
FIG. 4 illustrates a schematic plan view of a site with one or more GHG-emitting sources, according to an embodiment.

FIG. 4 illustrates a schematic plan view of a site 400 with one or more GHG-emitting sources 420A, 420B, according to an embodiment. The site 400 may include a perimeter 410. The GHG-emitting sources 420A, 420B may be located within the perimeter 410. The GHG-emitting sources 420A, 420B may be or include equipment such as one or more generators, one or more compressors, one or more valves, one or more tanks, one or more lines or conduits, one or more wells, one or more vehicles, or a combination thereof.

One or more devices (four are shown: 430A-430D) may be positioned in and/or around the site 400. The devices 430A-430D may each include one or more sensors: 431A-436A, 431B-436B, 431C-436C, 431D-436D. For example, the devices 430A-430D may each include a first sensor 431A-431D configured to measure a GHG concentration, a second sensor 432A-432D configured to measure a wind speed and/or direction, a third sensor 433A-433D configured to measure a solar radiation, a fourth sensor 434A-434D configured to measure a humidity, a fifth sensor 435A-435D configured to measure GPS coordinates, a sixth sensor 436A-436D configured to measure a temperature, or a combination thereof.

GHG Sensors

The first (e.g., GHG) sensors 431A-431D may be or include ground permanent sensors that are part of an autonomous sensor grid that is positioned at least partially around the site 400. The GHG sensors 431A-431D may be configured to detect and/or measure fugitive GHG emissions better than traditional discrete surveying methods. The GHG sensors 431A-431D may be placed in and/or around the site 400 based at least partially upon on a latitude, longitude, and altitude of the site 400, an area of the site 400, a terrain (e.g., mountains, rivers, lakes, trees, desert, etc.) in and around the site 400, structures (e.g., buildings) in and around the site 400, a type of the GHG-emitting sources 420A, 420B at the site 400, a location of the GHG-emitting sources 420A, 420B at the site 400, current and/or historical meteorological conditions at the site 400, or a combination thereof. A user may provide details of the site 400 or group of sites to be monitored. A placement algorithm may be used to determine the number of GHG sensors 431A-431D to use and where to place them.

Device Provisioning

In order to monitor a facility or a group, a user with access may enter the information to connect to the sensors' data stream. The user may provide a list of locations to be monitored including details such as facility type, equipment, component list, fluids type, fluids and/or volumes managed, boundaries, locations of equipment, or a combination thereof. The user may also or instead provide the location, type of sensors, and/or unique identifiers of devices installed in the field. The user may also or instead provide identifiers of any routing equipment used to stream information from the field devices. The user may associate one or more devices to a particular site or sites.

Notifications Provisioning

In order to notify users of an event, a list of users responsible for a site or group of sites may be provided. More particularly, the user may select a site or a group of sites. The user may also add usernames of personnel to be notified when an event has been detected on the site. When a fugitive emission has been detected, located, and/or quantified, personnel responsible for the site may be notified.

Continuous Monitoring

As mentioned above, the field devices 430A-430D may detect and/or measure the methane concentration and local meteorological conditions. This collected data may be preprocessed on the edge. The data may also be compressed and streamed via a radio frequency, a data network, a satellite, etc. to a cloud ingestion endpoint. The cloud-based system, which may be hosted in a private or public cloud, may then ingest the data streamed from the individual sensors. The system may also verify the quality of the received data and route it to an algorithm responsible for a site or area. The algorithm may analyze the data stream from individual sensors and search for anomalies in the methane concentration measurements. As used herein, "anomalies" refer to a methane concentration above a predetermined threshold. When an excessive methane concentration is detected, additional sensors that can help to identify the source of the fugitive emission may be selected. The data from the selected sensors may be fed into an algorithm responsible for locating and quantifying the fugitive emission. This may be the same algorithm that searches for anomalies, or a different algorithm.

The solution provided by the system (e.g., the algorithm) may scale out horizontally over the cloud infrastructure to cope with processing many sites in parallel. Devices can be mapped to different tenants so that the data is segregated into separate storage and computed partitions may provide secure multitenancy.

The measured data may be checked for integrity using checksums and/or data quality checks to determine that data is not corrupted during transit and that corrupted data is not processed by the algorithms. The data may be encrypted during transit and storage to prevent tampering.

Data including false positives may be removed using artificial intelligence techniques. False positive removal may include categorization of fugitive and venting events using data science methods combining multi-modal data (e.g., sensors, meteorological, and operational data). The users may provide feedback based on the outcome of the alerts or lack of alerts, which may or may not be used to improve the accuracy of the data science methods in categorizing anomalies detected (e.g., vented vs. fugitive or false positive).

Thus, the system and method described herein may use physics-based models, data-driven models, or both, which may be fed with historical meteorological data, site attributes, and geographical attributes to determine where to place the sensors. The physics-based models, data-driven models, or both may also be used to detect, quantify, localize, and/or identify emission sources in a stream processing pipeline. The use of data science methods may improve the quality and reliability of detections (e.g., decrease false positives). This comprehensive workflow for detecting fugitive emissions may improve turn-around time. The models may also increase the accuracy of the localization and quantification of fugitive emission sources. The integration with other measurements may provide a holistic methane mitigation solution. The improved accuracy and reliability of source identification may reduce field trips and improve abatement planning (e.g., repair/maintenance).

Figure 5:
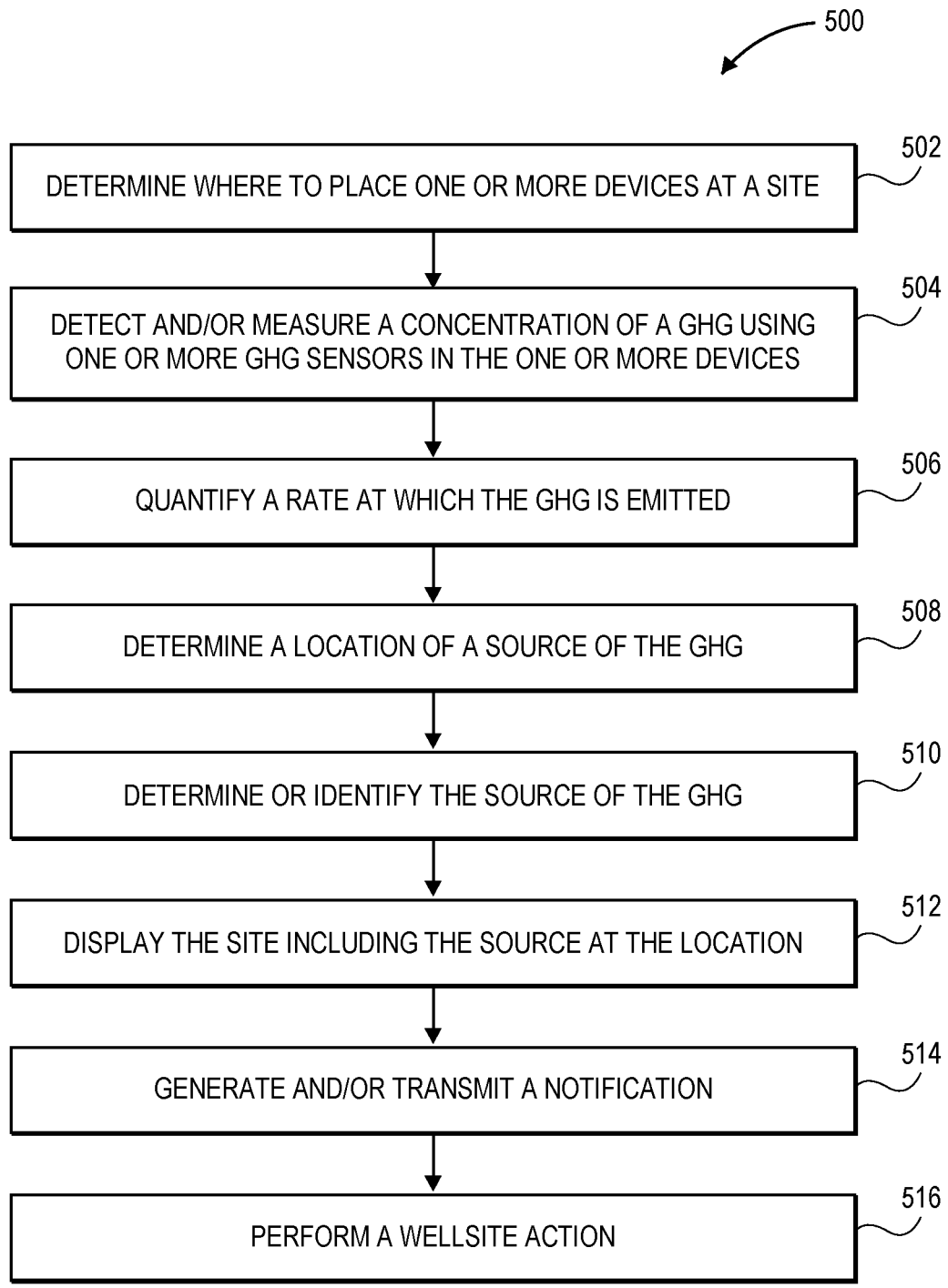
FIG. 5 illustrates a flowchart of a method for monitoring GHG emissions at the site, according to an embodiment.

FIG. 5 illustrates a flowchart of a method 500 for monitoring emissions at a site 400, according to an embodiment. More particularly, the method 500 may detect, measure, quantify, and/or locate fugitive gas (e.g., GHG) emissions at a wellsite 400. The GHG may be or include methane, carbon monoxide, carbon dioxide, or a combination thereof. An illustrative order of the method 500 is provided below; however, one or more portions of the method 500 may be performed in a different order, combined, split, repeated, or omitted. One or more portions of the method 500 may be performed by a computing system 600 (described below).

The method 500 may include determining where to place one or more devices 430A-430D at a site (e.g., a wellsite) 400, as at 502. As mentioned above, the devices 430A-430D may include GHG sensors 431A-431D that are configured to detect and/or measure GHG emissions. More particularly, the GHG sensors 431A-431D may be configured to measure an atmospheric GHG concentration. The determination may be made based at least partially upon the location of the site 400, the terrain in and/or around the site 400, the size of the site 400, the equipment at the site 400 (e.g., number, type, and/or location of the GHG-emitting sources 420A, 420B), present and/or historical meteorological conditions at the site 400, or a combination thereof. The devices 430A-430D may be placed at the determined locations.

The method 500 may also include detecting and/or measuring a concentration of a GHG at the site 400 using the GHG sensors 431A-431D, as at 504. This may include detecting and/or measuring when the atmospheric GHG concentration is greater than or equal to a predetermined threshold. More particularly, this may include detecting and/or measuring when the atmospheric GHG concentration is greater than or equal to a predetermined threshold for greater than or equal to a predetermined amount of time.

The method 500 may also include quantifying a rate at which the GHG is emitted, as at 506. This may include quantifying the rate of GHG emissions based upon the measurements from each GHG sensor 431A-431D individually (e.g., four rates may be calculated). In another embodiment, this may include quantifying the rate of GHG emissions based upon the combined measurements from the GHG sensors 431A-431D (e.g., one rate may be calculated).

The method 500 may also include determining a location of a source 420A, 420B of the GHG emissions, as at 508. This may also include determining the locations of two or more sources 420A, 420B. The location(s) may be determined based at least partially upon the measured GHG concentration, the quantified GHG rate, or both. For example, when the quantified GHG rate at one GHG sensor 431A exceeds a predetermined threshold, the quantified GHG rates from one or more other sensors 431B-431D may be used to determine the location(s) of the source(s) 420A, 420B (e.g., by triangulating the source(s)). The location(s) may also or instead be determined by an algorithm based at least partially upon the known location(s) of GHG-emitting sources 420A, 420B at the site 400, the type(s) of GHG-emitting sources 420A, 420B at the site 400, the type(s) and/or amount(s) of fluid being pumped, produced, or otherwise transferred, the boundaries 410 of the site 400, or a combination thereof.

The method 500 may also include determining or identifying the source(s) 420A, 420B of the GHG emissions, as at 510. The source(s) 420A, 420B may be determined or identified at least partially upon the determined location (from 508) and/or an inventory list for the site. For example, the source(s) 420A, 420B may be determined or identified by comparing the determined location(s) (from 508) against the inventory list which includes the known location(s) of GHG-emitting sources 420A, 420B at the site 400, the type(s) of GHG-emitting sources 420A, 420B at the site 400, the type(s) and/or amount(s) of fluid being pumped, produced, or otherwise transferred, the boundaries 410 of the site 420A, 420B, or a combination thereof. The particular source(s) 420A, 420B may be identified from the list based at least partially upon the comparison.

The method 500 may also include displaying the site 400, as at 512. More particularly, this may include generating and displaying an image of the site 400 including the perimeter 410, the measured concentration at each GHG sensor 431A-431D, the quantified rate (e.g., at each GHG sensor 431A-431D), the determined location(s) of the source(s) 420A, 420B, the identification of the source(s) 420A, 420B, or a combination thereof.

The method 500 may also include generating and/or transmitting a notification (e.g., an alert), as at 514. The notification may be transmitted to an authorized user. The notification may include the measured concentration, the quantified rate, the location(s) of the source(s) 420A, 420B, the particular source(s) that is/are determined (e.g., source 420A but not source 420B), or a combination thereof. In one embodiment, the notification may not be generated or transmitted when the measured concentration and/or quantified rate represent a false positive (e.g., which may occur during a known venting event).

The method 500 may also include performing a wellsite action, as at 516. The wellsite action may be performed based at least partially upon and/or at least partially in response to the measured concentration, the quantified rate, the location(s) of the source(s) 420A, 420B, the determined source(s) 420A, 420B, the display, the notification, or a combination thereof. In one embodiment, the wellsite action may be or include generating and/or transmitting a signal to the sources 420A, 420B, the devices 430A-430D, an authorized user, or a combination thereof. In another embodiment, the wellsite action may be or include reducing the speed of the source(s) 420A, 420B that is/are generating the fugitive emissions, turning off the source(s) 420A, 420B that is/are generating the fugitive emissions, repairing the source(s) 420A, 420B that is/are generating the fugitive emissions to reduce the emissions, replacing the source(s) 420A, 420B that is/are generating the fugitive emissions, or a combination thereof.

Figure 6:
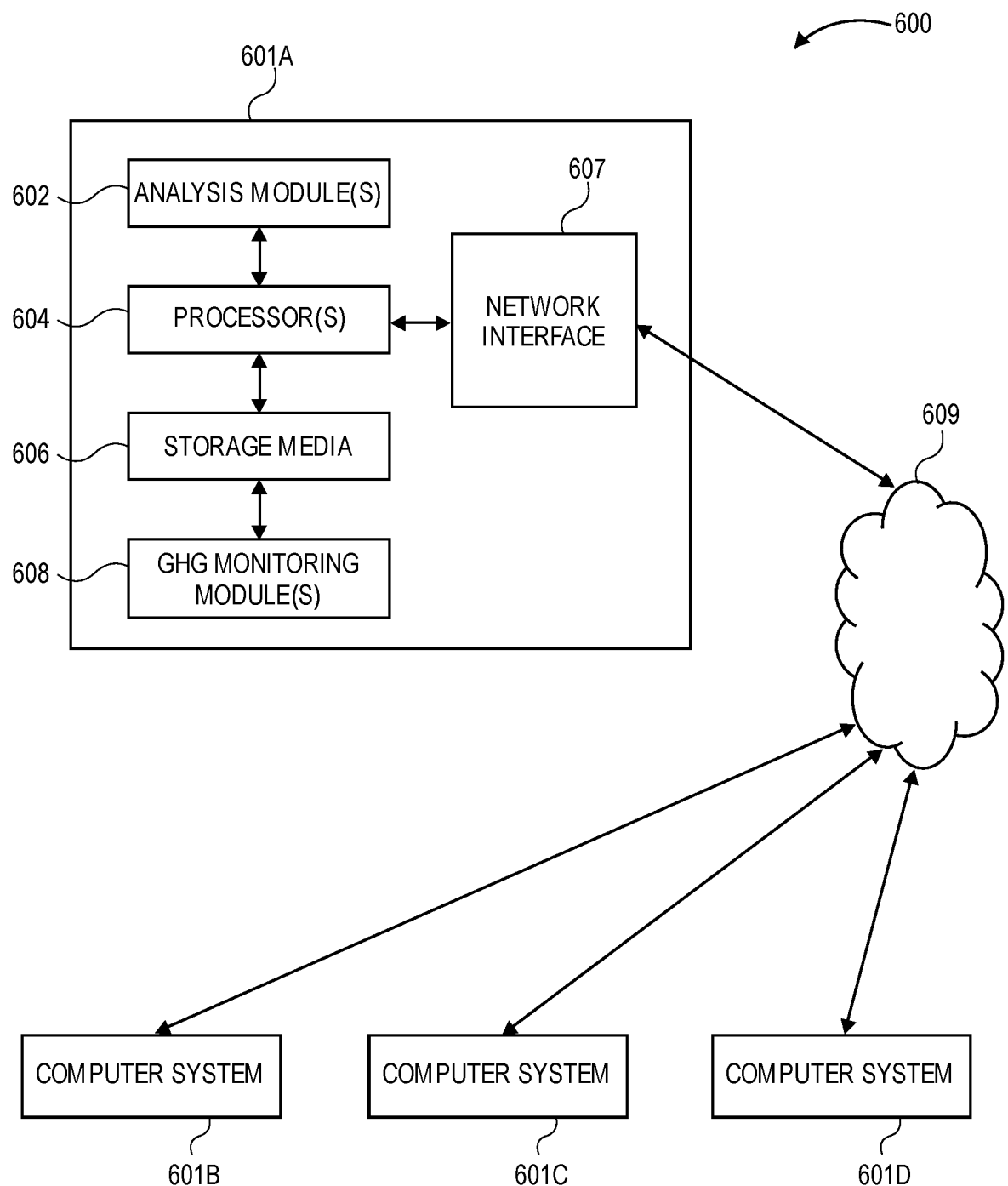
FIG. 6 illustrates a computing system for performing at least a portion of the method(s) disclosed herein, according to an embodiment.

In some embodiments, any of the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis module(s) 602 configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY© disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more GHG monitoring module(s) 608 that may perform at least a portion of one or more of the method(s) described above. It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   determining where to place one or more devices at a site, wherein each device comprises a first sensor configured to measure a concentration of a greenhouse gas (GHG), wherein the site comprises a plurality of potential GHG-emitting sources within a perimeter of the site;
   measuring the concentration of the GHG with the first sensor;
   quantifying a rate that the GHG is emitted based at least partially upon the measured concentration of the GHG;
   determining that the rate of the GHG is above a threshold;
   determining a location of a GHG-emitting source at the site that is emitting the GHG that is measured by the first sensor, wherein the location is determined based at least partially upon the rate being above the threshold, wherein the location comprises a first location or a second location;
   identifying a first subset of the plurality of potential GHG-emitting sources based on the location;
   filtering the first subset of the plurality of potential GHG-emitting sources to obtain a second subset of the plurality of potential GHG-emitting sources based at least in part on data indicating an amount of fluid being transferred within the site;

identifying the GHG-emitting source at the location from the second subset of the plurality of potential GHG-emitting sources;

transmitting a control signal that turns off the identified GHG-emitting source, wherein turning off the identified GHG-emitting source comprises disabling a generator, actuating one or more valves, or both;

transmitting a notification to a first computing device based on the location being the first location or transmitting the notification to a second computing device based on the location being the second location in response to identifying the GHG-emitting source; and displaying the site and the identified GHG-emitting source at the location.

2. The method of claim 1, wherein the determination where to place the one or more devices is based at least partially upon a latitude, a longitude, and an altitude of the site, an area of the site, a terrain in and around the site, structures in and around the site, types of the plurality of potential GHG-emitting sources at the site, locations of the plurality of potential GHG-emitting sources at the site, current and historical meteorological conditions at the site, or a combination thereof.

3. The method of claim 1, wherein the GHG-emitting source comprises a generator, a compressor, a valve, a tank, a line or conduit, a well, a vehicle, or a combination thereof.

4. The method of claim 1, wherein each device also comprises a second sensor configured to measure a wind speed and direction, wherein the location of the GHG-emitting source is also determined based at least partially upon the measured wind speed and direction.

5. The method of claim 1, wherein each device also comprises:
a third sensor configured to measure a solar radiation;
a fourth sensor configured to measure a humidity;
a fifth sensor configured to measure GPS coordinates; and
a sixth sensor configured to measure a temperature,
wherein the location of the GHG-emitting source is also determined based at least partially upon the solar radiation, the humidity, the GPS coordinates, and the temperature.

6. The method of claim 1, further comprising determining that the measured concentration of the GHG is not part of a scheduled venting event.

7. The method of claim 1, further comprising filtering based at least in part on the type of fluid being transferred within the site.

8. The method of claim 1, wherein identifying a first subset of the plurality of potential GHG-emitting sources based on the location comprises:
acquiring data from one or more additional sensors configured to measure an additional concentration of GHG, wherein the one or more additional sensors are different from the first sensor; and
identifying a first subset of the plurality of potential GHG-emitting sources based on the data from the one or more additional sensors.

9. The method of claim 1, where transmitting the control signal that turns off the identified GHG-emitting source further comprises adjusting drilling rates, weight on bit, or both.

10. A computing system, comprising:
one or more processors; and
a memory system comprising one or more non-transitory computer-readable media storing instructions that, when executed by at least one of the one or more processors, cause the computing system to perform operations, the operations comprising:
determining where to place one or more devices at a site, wherein each device comprises a first sensor configured to measure a concentration of a greenhouse gas (GHG), wherein the site comprises a plurality of potential GHG-emitting sources within a perimeter of the site;
measuring the concentration of the GHG with the first sensor-sensors;
quantifying a rate that the GHG is emitted based at least partially upon the measured concentration of the GHG;
determining that the rate of the GHG is above a threshold;
determining a location of a GHG-emitting source at the site that is emitting the GHG that is measured by the sensor, wherein the location is determined based at least partially upon the rate being above the threshold, wherein the location comprises a first location or a second location;
identifying a first subset of the plurality of potential GHG-emitting sources based on the location;
filtering the first subset of the plurality of potential GHG-emitting sources to obtain a second subset of the plurality of potential GHG-emitting sources based at least in part on data indicating an amount of fluid being transferred within the site;
identifying the GHG-emitting source at the location from the second subset of the plurality of potential GHG-emitting sources;
transmitting a control signal that turns off the identified GHG-emitting source, wherein turning off the identified GHG-emitting source comprises disabling a generator, actuating one or more valves, or both;
transmitting a notification to a first computing device based on the location being the first location or transmitting the notification to a second computing device based on the location being the second location in response to identifying the GHG-emitting source; and
displaying the site and the identified GHG-emitting source at the location.

11. The computing system of claim 10, wherein the determination where to place the one or more devices is based at least partially upon a latitude, a longitude, and an altitude of the site, an area of the site, a terrain in and around the site, structures in and around the site, types of the plurality of potential GHG-emitting sources at the site, locations of the plurality of potential GHG-emitting sources at the site, current and historical meteorological conditions at the site, or a combination thereof.

12. The computing system of claim 10, wherein each device also comprises a second sensor configured to measure a wind speed and direction, wherein the location of the GHG-emitting source is also determined based at least partially upon the measured wind speed and direction.

13. The computing system of claim 10, wherein each device also comprises:
a third sensor configured to measure a solar radiation;
a fourth sensor configured to measure a humidity;

a fifth sensor configured to measure GPS coordinates; and
a sixth sensor configured to measure a temperature,
wherein the location of the GHG-emitting source is also determined based at least partially upon the solar radiation, the humidity, the GPS coordinates, and the temperature.

14. The computing system of claim 10, wherein the operations further comprise determining that the measured concentration of the GHG is not part of a scheduled venting event.

15. The computing system of claim 10, wherein the operations further comprise performing a wellsite action in response to determining the location of the GHG-emitting source, identifying the GHG-emitting source, or both.

16. A non-transitory computer-readable medium storing instructions that, when executed by at least one processor of a computing system, cause the computing system to perform operations, the operations comprising:
determining where to place one or more devices at a site, wherein each device comprises a first sensor configured to measure a concentration of a greenhouse gas (GHG), wherein the site comprises a plurality of potential GHG-emitting sources within a perimeter of the site;
measuring the concentration of the GHG with the first sensor;
quantifying a rate that the GHG is emitted based at least partially upon the measured concentration of the GHG;
determining that the rate of the GHG is above a threshold;
determining a location of a GHG-emitting source at the site that is emitting the GHG that is measured by the first sensor, wherein the location is determined based at least partially upon the rate being above the threshold wherein the location comprises a first location or a second location;
identifying a first subset of the plurality of potential GHG-emitting sources based on the location;
filtering the first subset of the plurality of potential GHG-emitting sources to obtain a second subset of the plurality of potential GHG-emitting sources based at least in part on data indicating an amount of fluid being transferred within the site;
identifying the GHG-emitting source at the location from the second subset of the plurality of potential GHG-emitting sources;
transmitting a control signal that turns off the identified GHG-emitting source, wherein turning off the identified GHG-emitting source comprises disabling a generator, actuating one or more valves, or both;
transmitting a notification to a first computing device based on the location being the first location or transmitting the notification to a second computing device based on the location being the second location in response to identifying the GHG-emitting source; and
displaying the site and the identified GHG-emitting source at the location.

17. The non-transitory computer-readable medium of claim 16, wherein each device also comprises a second sensor configured to measure a wind speed and direction, wherein the location of the GHG-emitting source is also determined based at least partially upon the measured wind speed and direction.

18. The non-transitory computer-readable medium of claim 16, wherein each device also comprises:
a third sensor configured to measure a solar radiation;
a fourth sensor configured to measure a humidity;
a fifth sensor configured to measure GPS coordinates; and
a sixth sensor configured to measure a temperature,
wherein the location of the GHG-emitting source is also determined based at least partially upon the solar radiation, the humidity, the GPS coordinates, and the temperature.

19. The non-transitory computer-readable medium of claim 16, wherein the operations further comprise performing a wellsite action in response to determining the location of the GHG-emitting source, identifying the GHG-emitting source, or both.

* * * * *